(12) United States Patent
Chen et al.

(10) Patent No.: US 7,986,464 B2
(45) Date of Patent: Jul. 26, 2011

(54) IMAGING SYSTEM

(75) Inventors: Jung-Yao Chen, Hsinchu (TW);
Wei-Chung Chao, Hsinchu (TW);
Yu-Tsung Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 34 days.

(21) Appl. No.: 12/453,791

(22) Filed: May 22, 2009

(65) Prior Publication Data
US 2009/0323202 A1    Dec. 31, 2009

Related U.S. Application Data

(60) Provisional application No. 61/129,433, filed on Jun. 26, 2008.

(51) Int. Cl.
*G02B 9/04* (2006.01)
*G02B 13/18* (2006.01)
*G02B 17/00* (2006.01)
*G02B 9/62* (2006.01)

(52) U.S. Cl. ........ 359/651; 359/793; 359/762; 359/717; 359/726

(58) Field of Classification Search .......... 359/649–651, 359/680–682, 749, 753, 755, 761, 770, 762, 359/781, 784, 717, 726–728
See application file for complete search history.

(56) References Cited

U.S. PATENT DOCUMENTS

| | | | |
|---|---|---|---|
| 5,760,965 A * | 6/1998 | Kim | 359/651 |
| 6,147,812 A | 11/2000 | Narimatsu et al. | |
| 6,471,359 B1 * | 10/2002 | Kim et al. | 359/651 |
| 7,411,737 B2 * | 8/2008 | Imaoka et al. | 359/649 |
| 7,643,220 B2 * | 1/2010 | Chen et al. | 359/680 |
| 7,701,649 B2 * | 4/2010 | Huang et al. | 359/754 |

OTHER PUBLICATIONS

Geary, Joseph M. Introduction to Lens Design: with Practical ZEMAX Examples. Richmond, VA: Willmann-Bell, 2002. Print.*
Ohara Inc. : S-BSM. OHARA. Web. Oct. 21, 2010. <http://www.ohara-inc.co.jp/en/product/optical/list/s-bsm.html>.*

* cited by examiner

*Primary Examiner* — Ricky L Mack
*Assistant Examiner* — Zachary Wilkes
(74) *Attorney, Agent, or Firm* — Bacon & Thomas PLLC

(57) ABSTRACT

An image system adapted to a projection display apparatus includes a first lens group having a negative refractive power, a second lens group having a positive refractive power, an aspheric reflector, and a curved reflector. The second lens group includes an aspheric lens which is the nearest to the light valve in the second lens group. A material of the aspheric lens includes glass, the thermal-optical coefficient of the glass is between $1.0 \times 10^{-6}$/K and $12.5 \times 10^{-6}$/K, and the refractive index of the glass is between 1.482 and 1.847. The aspheric reflector is disposed front of the first lens group for reflecting the image beam passing through the first lens group and second lens group. The curved reflector is disposed above the first lens group for reflecting the image beam reflected by the aspheric reflector onto the screen. The image system has a good imaging quality.

7 Claims, 7 Drawing Sheets

IMAGING SYSTEM

CROSS REFERENCE TO RELATED APPLICATION

This application claims the benefit of U.S. Provisional Patent Application Ser. No. 61/129,433, filed Jun. 26, 2008.

BACKGROUND OF THE INVENTION

1. Field of the Invention

The invention generally relates to an image system. More particularly, the invention relates to an image system of a projection display apparatus.

2. Description of Related Art

In order that an image system adapted to a projection display apparatus may have a good imaging quality, the image frame projected by the image system may conform to a low aberration, a high resolution, a high contrast ratio, and a high uniformity. Moreover, designing the image system of the visible light and the infrared light focusing on the same one plane usually needs lenses made by a special optical material of dispersion.

However, the refractive index of the special optical material of dispersion obviously decreases with the temperature raising. In other words, the thermal-optical coefficient (equate dn/dt, wherein n is refractive index and t is absolute temperature) of the special optical material of dispersion is negative value, and the absolute value of the thermal-optical coefficient of the special optical material of dispersion is higher than that of a general material. Therefore, a focusing plane of the light may shift.

FIG. 1 is a schematic view of a conventional focusing surface shifting with temperature of an image system. Referring to FIG. 1, a lens 50 of an image system is made by a special optical material of dispersion, and the refractive index of the lens 50 obviously decreases with the temperature raising. In FIG. 1, the transmission path of the light beam 60 is the transmission path of light when the temperature of the lens 50 is 20 degrees Celsius, and the transmission path of the light beam 60' is the transmission path of light when the temperature of the lens 50 is 40 degrees Celsius. The light beam 60 is focused on a plane 70 and the light beam 60' is focused on a plane 80. In other words, with the temperature of the lens 50 increasing, a back focal length (BFL) D of the image system is longer so that the imaging quality of the image system becomes worse.

SUMMARY OF THE INVENTION

The invention is directed to an image system for increasing imaging quality.

Additional aspects and advantages of the present invention will be set forth in the description of the techniques disclosed in the invention.

An embodiment of the invention provides an image system adapted to a projection display apparatus and projecting an image beam provided by a light valve of the projection display apparatus onto a screen of the projection display apparatus. The image system includes a first lens group, a second lens group, an aspheric reflector, and a curved reflector. The first lens group has a negative refractive power and includes a first aspheric lens and a second aspheric lens, and the first aspheric lens and the second aspheric lens each have a negative refractive power. The second lens group has a positive refractive power and is disposed between the first lens group and the light valve. The second lens group includes a third aspheric lens having a positive refractive power, and the third aspheric lens is the nearest to the light valve in the second lens group. A material of the third aspheric lens includes glass, wherein the thermal-optical coefficient of the glass is between $1.0\times10^{-6}$/K and $12.5\times10^{-6}$/K, and the refractive index of the glass is between 1.482 and 1.847. The aspheric reflector is disposed on a transmission path of the image beam and located between the first lens group and the screen for reflecting the image beam passing through the first lens group and second lens group. The curved reflector is disposed on the transmission path of the image beam and located between the aspheric reflector and the screen for reflecting the image beam reflected by the aspheric reflector onto the screen.

Another embodiment of the invention provides an image system adapted to a projection display apparatus and projecting an image beam provided by a light valve of the projection display apparatus onto a screen of the projection display apparatus. The image system includes a first lens group, a second lens group, an aspheric reflector, and a curved reflector. The first lens group has a negative refractive power and includes a first aspheric lens, a second aspheric lens, a first lens, and a second lens arranged in order. The first aspheric lens and the second aspheric lens each have a negative refractive power, and the first lens and the second lens each have a positive refractive power. The second lens group has a positive refractive power and is disposed between the first lens group and the light valve. The second lens group includes a third lens, a fourth lens, a fifth lens, a sixth lens, a seventh lens, a eighth lens, a ninth lens, a tenth lens, a eleventh lens, and a third aspheric lens arranged in order. The third aspheric lens is disposed between the eleventh lens and the light valve. A material of the third aspheric lens includes glass, and the third aspheric lens is a molding glass. Refractive powers of the third lens, the fourth lens, the fifth lens, the sixth lens, the seventh lens, the eighth lens, the ninth lens, the tenth lens, and the eleventh lens are positive, negative, positive, negative, positive, positive, positive, negative, and positive respectively, and the third aspheric lens has a positive refractive power. The aspheric reflector is disposed on the transmission path of the image beam and located between the first lens group and the screen for reflecting the image beam passing through the first lens group and second lens group. The curved reflector is disposed on the transmission path of the image beam and located between the aspheric reflector and the screen for reflecting the image beam reflected by the aspheric reflector onto the screen.

Another embodiment of the invention provides an image system adapted to a projection display apparatus and projecting an image beam provided by a light valve of the projection display apparatus onto a screen of the projection display apparatus. The image system includes a first lens group, a second lens group, an aspheric reflector, and a curved reflector. The first lens group has a negative refractive power and includes a first aspheric lens, a second aspheric lens, a first lens, a second lens, and a third lens arranged in order. The first aspheric lens and the second aspheric lens each have a negative refractive power, and the first lens, the second lens and the third lens each have a positive refractive power. The second lens group has a positive refractive power and is disposed between the first lens group and the light valve. The second lens group includes a fourth lens, a fifth lens, a sixth lens, a seventh lens, a eighth lens, a ninth lens, a tenth lens, a eleventh lens, and a third aspheric lens arranged in order. The third aspheric lens is disposed between the eleventh lens and the light valve. A material of the third aspheric lens includes glass, and the third aspheric lens is a cemented glass. Refractive powers of the fourth lens, the fifth lens, the sixth lens, the seventh lens, the eighth lens, the ninth lens, the tenth lens, and the eleventh lens are negative, positive, negative, positive, positive, positive, negative, and positive respectively, and the third aspheric lens has a positive refractive power. The aspheric reflector is disposed on the transmission path of the image beam and located between the first lens group and the screen for reflecting the image beam passing through the first lens group and second lens group. The curved reflector is disposed on the transmission path of the image beam and located between the aspheric reflector and the screen for reflecting the image beam reflected by the aspheric reflector onto the screen.

In the image system of the embodiments of the invention, because the material of the third aspheric lens includes glass, the refractive index of the third aspheric lens does not easily decrease with the temperature raising, so that the back focal length of the image system does not shift with the temperature variation of the image system. Therefore, the image quality of the image system of the embodiments is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiment of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
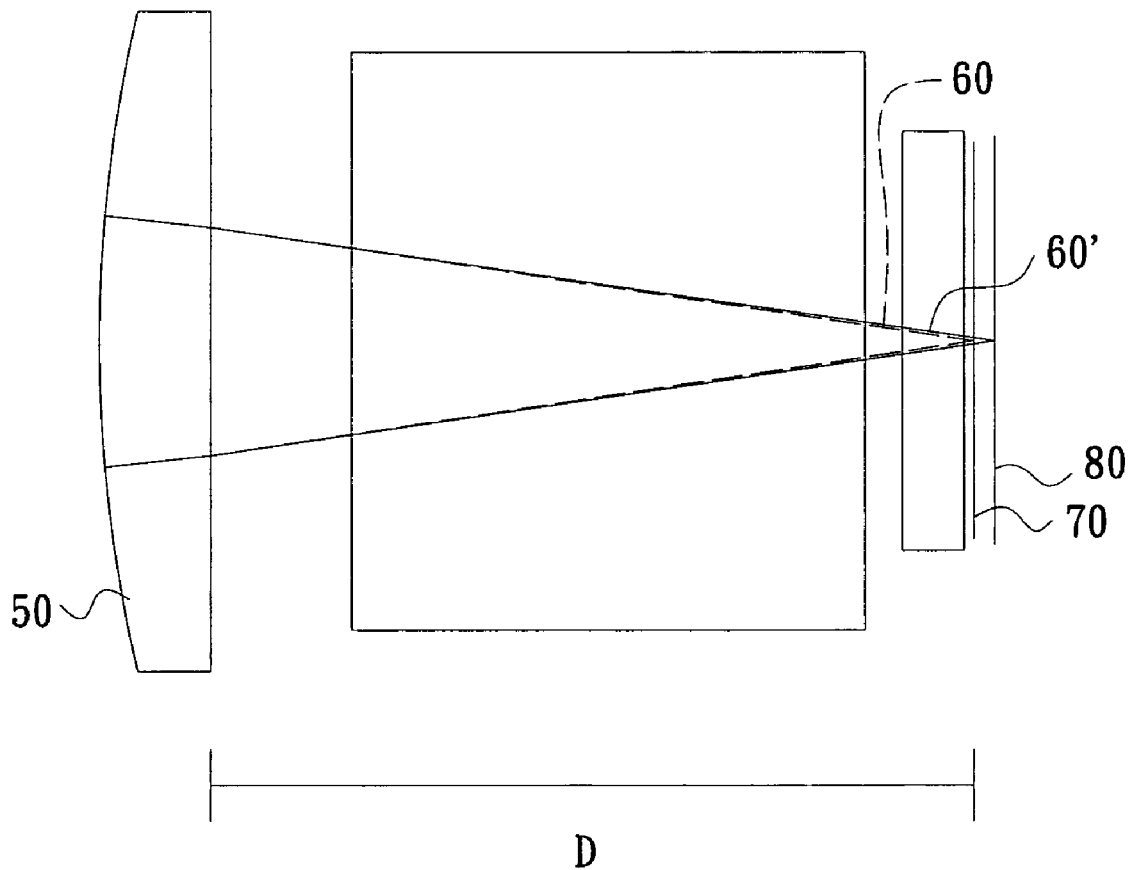
FIG. 1 is a schematic view of a conventional focusing surface shifting with temperature of an image system.
Figure 2:
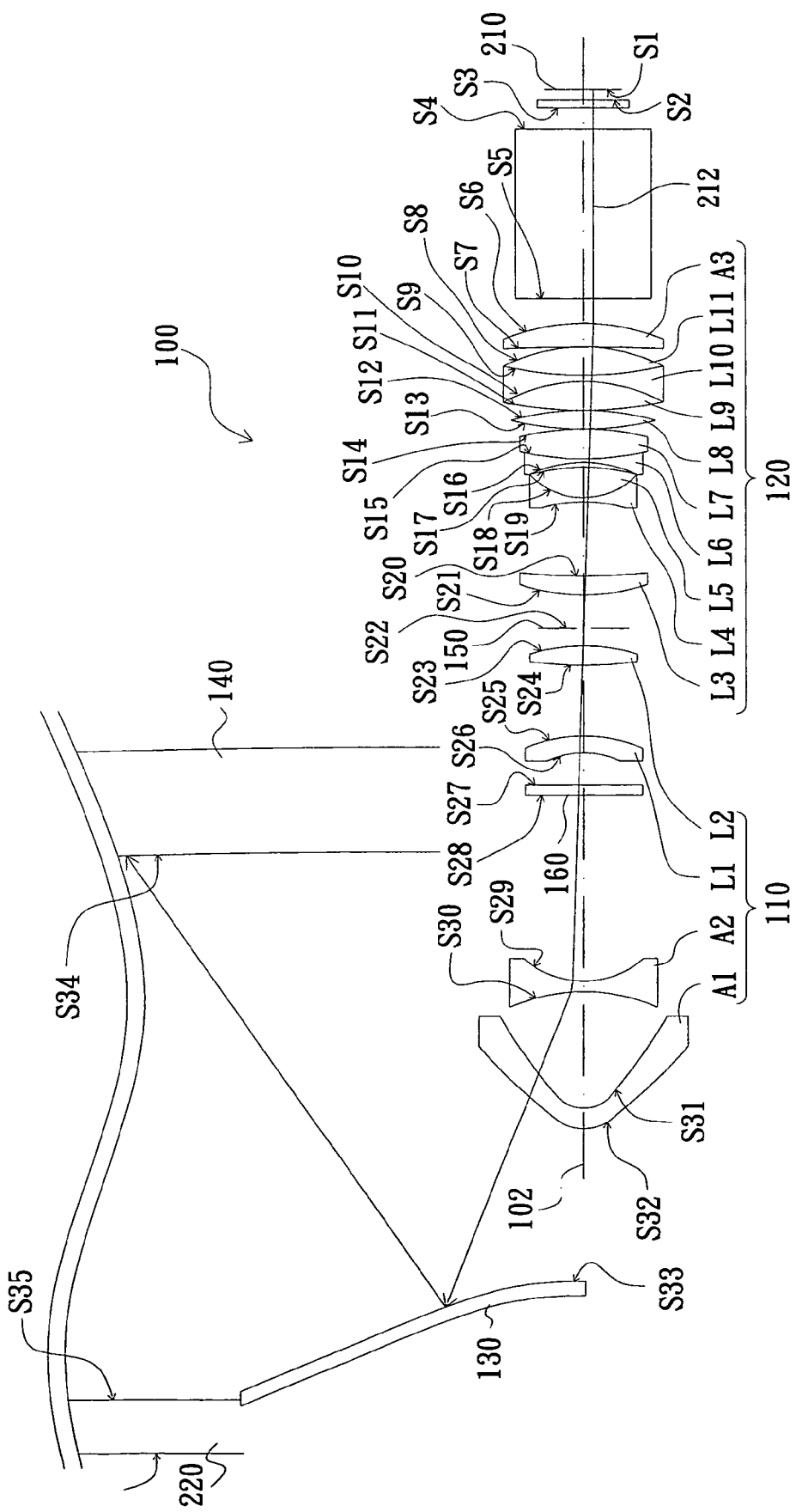
FIG. 2 is a schematic view of an image system according to a first embodiment of the invention.

FIG. 2 is a schematic view of an image system according to a first embodiment of the invention. Referring to FIG. 2, the image system 100, adapted to a projection display apparatus such as a rear projection display apparatus, projects an image beam 212 provided by a light valve 210 of the rear projection display apparatus onto a screen 220 of the rear projection display apparatus. The light valve 210 is, for example, a digital micro-mirror device (DMD), but is not limited thereto. The image system 100 includes a first lens group 110, a second lens group 120, an aspheric reflector 130, and a curved reflector 140. The first lens group 110 has a negative refractive power and includes a first aspheric lens A1 and a second aspheric lens A2. The first aspheric lens A1 and the second aspheric lens A2 each have a negative refractive power. Furthermore, the second lens group 120 has a positive refractive power and is disposed between the first lens group 110 and the light valve 210. The second lens group 120 includes a third aspheric lens A3 having a positive refractive power, and the third aspheric lens A3 is the nearest to the light valve 210 in the second lens group 120. The aspheric reflector 130 is disposed on a transmission path of the image beam 212 and located between the first lens group 110 and the screen 220, and the curved reflector 140 is disposed on the transmission path of the image beam 212 and located between the aspheric reflector 130 and the screen 220. The image beam 212 provided by the light valve 210 sequentially passes through the first lens group 110 and second lens group 120, and then the image beam 212 is reflected to the curved reflector 140 by the aspheric reflector 130. Besides, the curved reflector 140 reflects the image beam 212 reflected by the aspheric reflector 130 onto the screen 220 to form image frames.

The foregoing image system 100, a material of the third aspheric lens A3 includes glass, wherein the thermal-optical coefficient of the glass is between $1.0 \times 10^{-6}$/K and $12.5 \times 10^{-6}$/K, and the refractive index of the glass is between 1.482 and 1.847. The third aspheric lens A3 is, for example, a molding glass.

In the embodiment of the invention, the first lens group 110 further includes a first lens L1 and a second lens L2. The first aspheric lens A1, the second aspheric lens A2, the first lens L1, and the second lens L2 are arranged in order, the second lens L2 is disposed between the first lens L1 and the second lens group 120, and the first lens L1 and the second lens L2 each have a positive refractive power and are, for example, spherical lenses. Furthermore, the second lens group 120 further includes a third lens L3, a fourth lens L4, a fifth lens L5, a sixth lens L6, a seventh lens L7, a eighth lens L8, a ninth lens L9, a tenth lens L10, and a eleventh lens L11 arranged in order. The eleventh lens L11 is disposed between the tenth lens L10 and the third aspheric lens A3. Refractive powers of the third lens L3, the fourth lens L4, the fifth lens L5, the sixth lens L6, the seventh lens L7, the eighth lens L8, the ninth lens L9, the tenth lens L10, and the eleventh lens L11 are positive, negative, positive, negative, positive, positive, positive, negative, and positive respectively, and the third lens L3, the fourth lens L4, the fifth lens L5, the sixth lens L6, the seventh lens L7, the eighth lens L8, the ninth lens L9, the tenth lens L10, and the eleventh lens L11 are, for example, spherical lenses. In addition, the image system 100 further includes an aperture stop 150 disposed between the first lens group 110 and the second lens group 120. The image system 100 further includes a plate glass 160 disposed between the second aspheric lens A2 and the first lens L1. The plate glass 160 may have light filtration function.

The various data of the image system 100 of the embodiment of the invention is given hereinafter. In Table 1, the interval is the straight distance from the surface $S_N$ to the surface $S_{N+1}$ on the optical axis 102, wherein the surface $S_N$ is the surface number. In addition, in FIG. 2, the surface $S_{N+1}$ is located at the left of the surface $S_N$, but the surface S34 is excepted. Because the surface S34 is located at the right of the surface S33, so the interval of the S33 is negative. In addition, the surface S35 and the surface S36 are the two surfaces of the screen 220, and the image frames are formed on the surface S36.

To be noted, the data of Table 1 and Table 2 listed below are not used for limiting the invention. The parameters or settings may be altered by persons skilled in the art with reference to the disclosure of the invention, which still falls in the scope of the present invention.

TABLE 1

| Surface | Radius of Curvature (mm) | Interval (mm) | Refractive Index | Abbe's number | Notes |
|---|---|---|---|---|---|
| S1 | Infinity | 1.11 | | | light valve |
| S2 | Infinity | 1.05 | 1.506905 | 63.128269 | cover glass |
| S3 | Infinity | 5.15 | | | |
| S4 | Infinity | 35.25987 | 1.56883 | 56.130661 | total internal reflection |
| S5 | Infinity | 5.000604 | | | |

TABLE 1-continued

| Surface | Radius of Curvature (mm) | Interval (mm) | Refractive Index | Abbe's number | Notes |
|---|---|---|---|---|---|
| S6 | 32.15099 | 5.00116 | 1.51633 | 64.065129 | third aspheric lens |
| S7 | 391.0361 | 0.2017168 | | | |
| S8 | 40.77197 | 6.002964 | 1.528554 | 76.975515 | eleventh lens |
| S9 | −75.6635 | 1.300328 | 1.816 | 46.620561 | tenth lens |
| S10 | 36.11477 | 5.982508 | 1.528554 | 76.975515 | ninth lens |
| S11 | −56.06162 | 0.1517979 | | | |
| S12 | 97.74678 | 3.575969 | 1.496997 | 81.608364 | eighth lens |
| S13 | −71.22082 | 0.1517804 | | | |
| S14 | 54.20289 | 6.002964 | 1.528554 | 76.975515 | seventh lens |
| S15 | −79.4898 | 1.200271 | 1.799518 | 42.368074 | sixth lens |
| S16 | 30.00068 | 1.195367 | | | |
| S17 | 66.39612 | 6.003192 | 1.496997 | 81.608364 | fifth lens |
| S18 | −20.26361 | 1.100273 | 1.834807 | 42.713673 | fourth lens |
| S19 | 133.2485 | 15.35063 | | | |
| S20 | −483.7276 | 4.00128 | 1.612931 | 37.038954 | third lens |
| S21 | −31.29326 | 10.54248 | | | |
| S22 | Infinity | 0.6955796 | | | aperture stop |
| S23 | 110.8402 | 3.001482 | 1.528554 | 76.975515 | second lens |
| S24 | −658.7802 | 16.43474 | | | |
| S25 | 36.23915 | 3.684378 | 1.496997 | 81.608364 | first lens |
| S26 | 59.30344 | 5.804663 | | | |
| S27 | Infinity | 2.000648 | 1.52308 | 58.571369 | plate glass |
| S28 | Infinity | 38.55625 | | | |
| S29 | −50.40512 | 3.007204 | 1.491756 | 57.440791 | second aspheric lens |
| S30 | 28.03282 | 24.48345 | | | |
| S31 | −5.818146 | 4.009606 | 1.491756 | 57.440791 | first aspheric lens |
| S32 | −9.592756 | 33.03289 | | | |
| S33 | 54.01222 | −91 | | | aspheric reflector |
| S34 | 3200 | 116 | | | curved reflector |
| S35 | Infinity | 12.02882 | 1.491756 | 57.440791 | screen |
| S36 | Infinity | | | | |

In addition, the surfaces S6, S7, S29, S30, S31, S32, and S33 are aspheric surfaces expressed by a formula as follows:

$$Z(h) = \frac{h^2/r}{1+\sqrt{1-(1+k)(h^2/r^2)}} + C_2 h^2 + C_4 h^4 + C_6 h^6 + C_8 h^8 + C_{10} h^{10} + C_{12} h^{12} + \ldots$$

where Z(h) is a sag along the optical axis 120; r is the radius of an osculating sphere, i.e., the radius of curvature close to the optical axis 120 (the radius of curvatures of S6, S7, S29, S30, S31, S32, and S33 are shown in Table 1). K is a conic constant and h is an aspheric height, i.e., the height from the center to the edge of the lens. $C_2$, $C_4$, $C_6$, $C_8$, $C_{10}$, and $C_{12}$ ... are aspheric coefficients. The values of K, $C_4$, $C_6$, $C_8$, and $C_{10}$ are shown in Table 2, $C_2$ is zero in this embodiment.

TABLE 2

| | K | $C_4$ | $C_6$ | $C_8$ | $C_{10}$ |
|---|---|---|---|---|---|
| S6 | −1.942673 | −8.1282646E−06 | 9.5232759E−09 | −9.2229590E−12 | 2.2589059E−14 |
| S7 | 0 | 1.7693229E−08 | −4.8410421E−10 | 3.1549437E−12 | 1.1003287E−14 |
| S29 | 4.671622 | −6.2694057E−05 | 5.5806059E−08 | −3.2454114E−10 | 1.2714046E−12 |
| S30 | −5.605272 | 4.7246130E−07 | −3.8755971E−08 | 1.9386080E−10 | −1.5743253E−13 |
| S31 | −0.9851561 | 8.4502808E−05 | 1.2418810E−07 | −7.9317255E−10 | 1.5665527E−12 |
| S32 | −0.863168 | 6.4948628E−05 | −7.4595448E−11 | −1.0016883E−10 | 1.6913107E−13 |
| S33 | −4.979204 | −1.7162513E−08 | 1.6235033E−12 | −7.8365140E−17 | −3.7512596E−21 |

The image system 100 of the embodiment, because the lens nearest to the light valve 210 is the third aspheric lens A3 having a positive refractive power, so that aberration is effective decreased. Furthermore, the third aspheric lens A3 of the embodiment is a molding glass, when the temperature of the image system 100 is about 20 degrees Celsius, the diameter of geometric light spot of the visible light formed on the light valve 210 is about 202 micrometers. When the temperature of the image system 100 is about 40 degrees Celsius, the diameter of geometric light spot of the visible light formed on the light valve 210 is about 928 micrometers. In other words, the diameter variation of geometric light spot of the visible light formed on the light valve 210 is about 4.6 times. However, when the material of the aspheric lens is plastic, the diameter variation is about 17 times. In addition, when the temperature of the image system 100 raises from 20 degrees Celsius to 40 degrees Celsius, the diameter of geometric light spot of the infrared light formed on the light valve 210 increases from 360 micrometers to 1234 micrometers. In other words, the diameter variation of geometric light spot of the infrared light formed on the light valve 210 is about 3.4 times. However, when the material of the aspheric lens is plastic, the diameter variation is about 10.7 times.

According to the above description, because the material of the third aspheric lens A3 is the molding glass, the refractive index of the third aspheric lens A3 does not easily decrease with the temperature raising, so as to prevent the back focal length of the image system 100 from shifting substantially with the temperature variation of the image system 100 and assist the visible light and the infrared light to focus on the same plane. Therefore, the image quality of the image system 100 of the embodiments is improved.

Figure 3A:
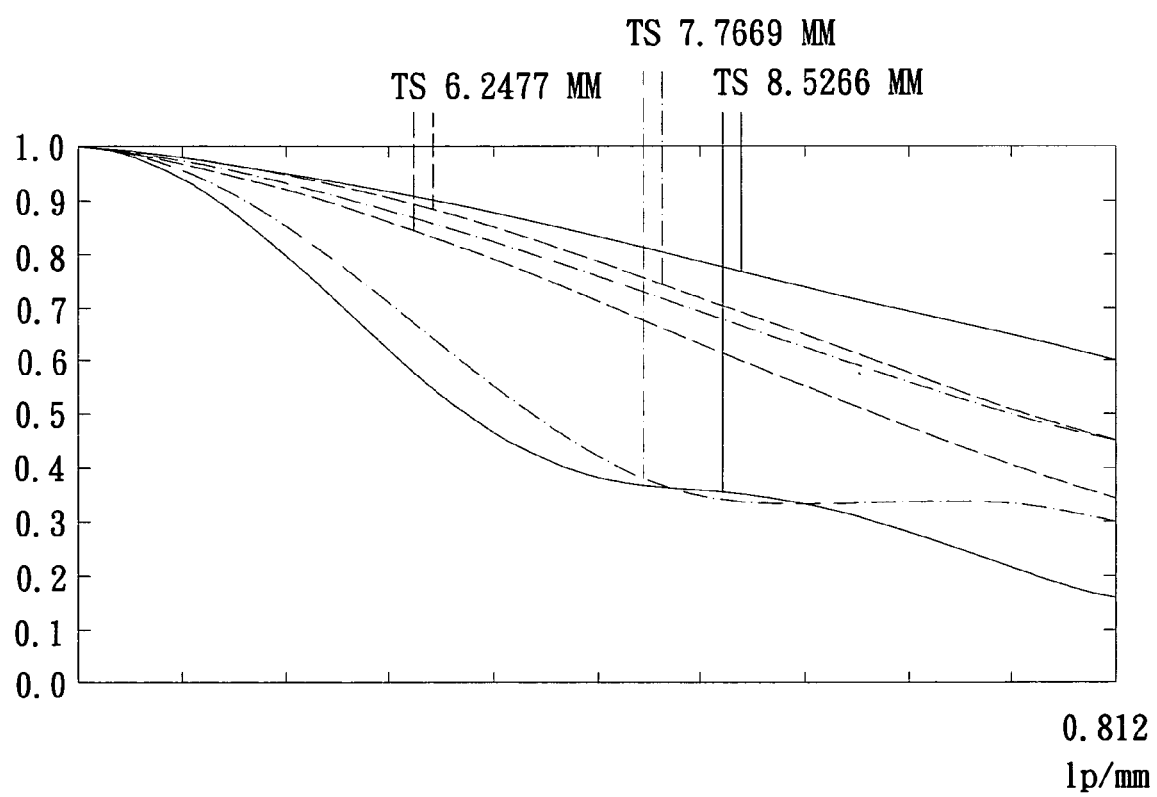
FIG. 3A is an optical modulation transfer function diagram of the image system according to the first embodiment of the invention.
Figure 3B:
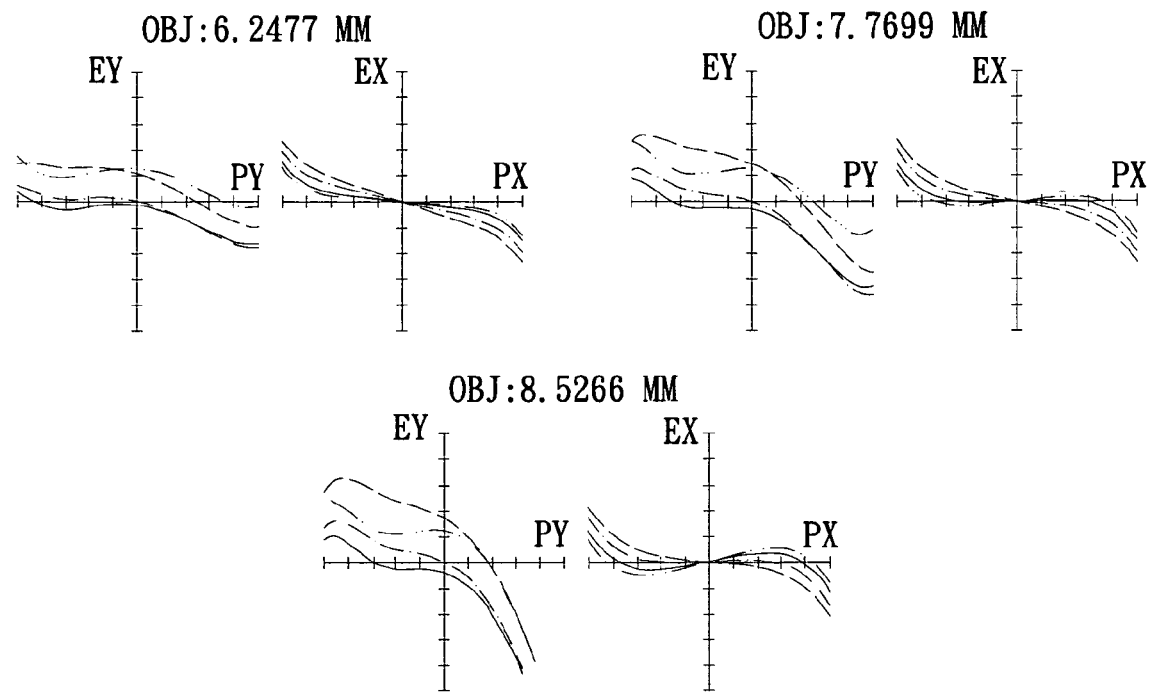
FIG. 3B is transverse ray fan diagrams of the image system according to the first embodiment of the invention.
Figure 3C:
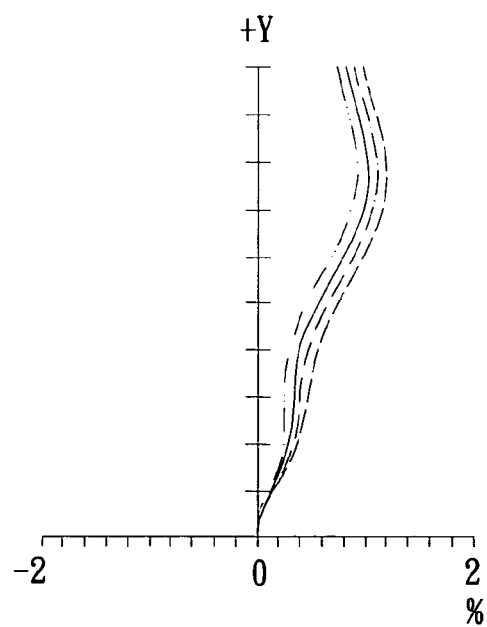
FIG. 3C is a distortion diagram of the image system according to the first embodiment of the invention.

FIG. 3A is an optical modulation transfer function (MTF) diagram of the image system according to the first embodiment of the invention, in which the transverse axis is the line pair per millimeter, and the vertical axis is the recognition rate. FIG. 3B is transverse ray fan diagrams of the image system according to the first embodiment of the invention, and FIG. 3C is a distortion diagram of the image system according to the first embodiment of the invention. As described above, the graphics in FIGS. 3A to 3C fall within standard ranges, so that the image system 100 of the embodiment has a good imaging quality.

Figure 4:
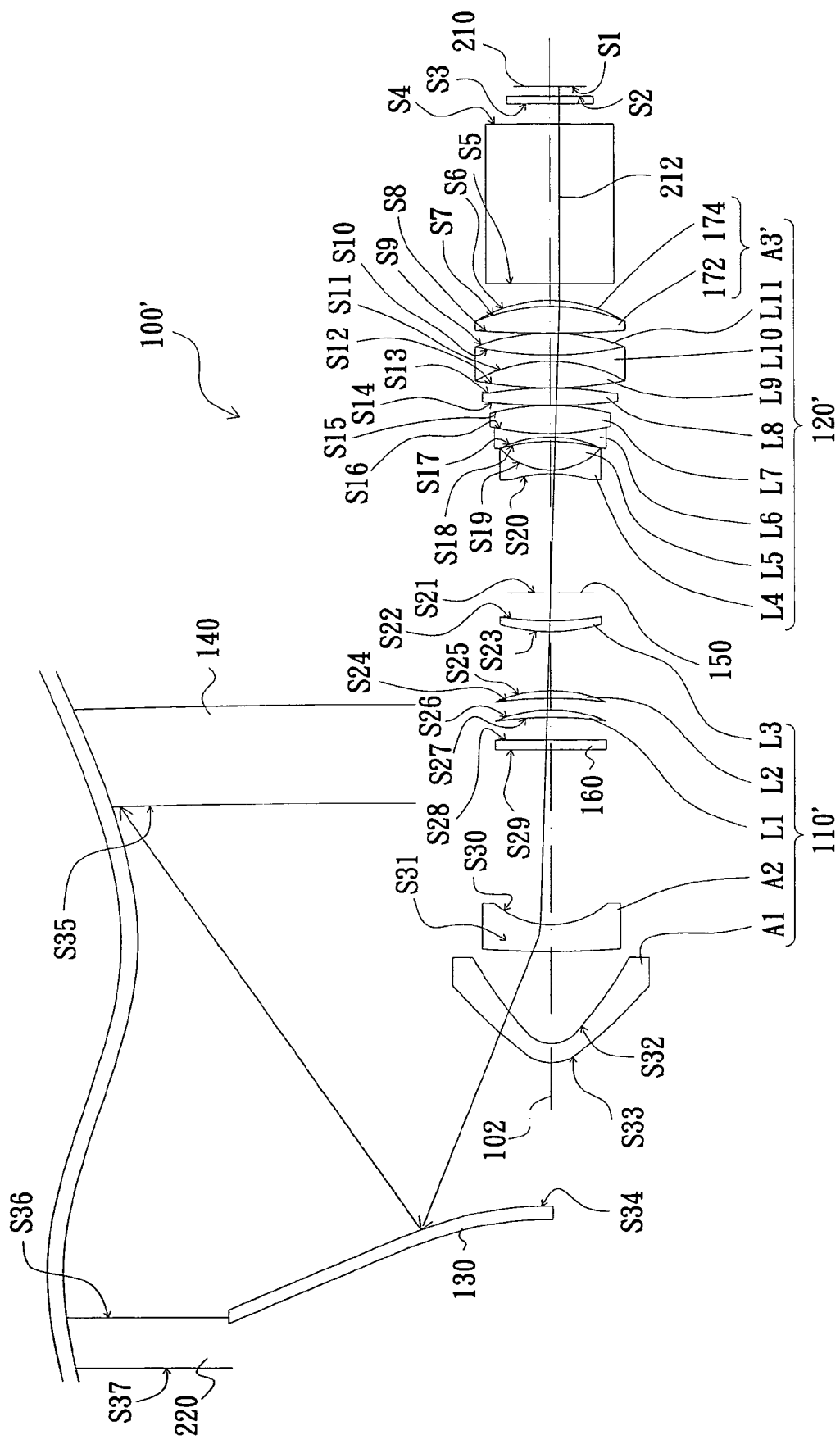
FIG. 4 is a schematic view of an image system according to a second embodiment of the invention.

FIG. 4 is a schematic view of an image system according to a second embodiment of the invention. Referring to FIG. 4, the image system 100' of this embodiment and the image system 100 in FIG. 2 have similar frame and advantage, so thereinafter only explain the difference in the frame. The first lens group 110' of the image system 100' of this embodiment has a negative refractive power and includes a first aspheric lens A1, a second aspheric lens A2, a first lens L1, a second lens L2, and a third lens L3 arranged in order. The first aspheric lens A1 and the second aspheric lens A2 each have a negative refractive power, and the first lens L1, the second lens L2 and the third lens L3 have a positive refractive power. The second lens group 120' of the image system 100' has a positive refractive power and includes a fourth lens L4, a fifth lens L5, a sixth lens L6, a seventh lens L7, a eighth lens L8, a ninth lens L9, a tenth lens L10, a eleventh lens L11, and a third aspheric lens A3' arranged in order. Refractive powers of the fourth lens L4, the fifth lens L5, the sixth lens L6, the seventh lens L7, the eighth lens L8, the ninth lens L9, the tenth lens L10, and the eleventh lens L11 are negative, positive, negative, positive, positive, positive, negative, and positive respectively, and the third aspheric lens A3' has a positive refractive power. Furthermore, the material of the third aspheric lens A3' includes glass. To be specific, the third aspheric lens A3' is a cemented lens. The cemented lens is made up of a glass lens 172 and a membrane 174 fixed on the glass lens 172. The thermal-optical coefficient of the glass lens is between $1.0 \times 10^{-6}$/K and $12.5 \times 10^{-6}$/K, and the refractive index of the glass lens is between 1.482 and 1.847.

The various data of the image system 100' of the embodiment of the invention is given hereinafter. Table 3 is similar to Table 1, because the surface S35 is located at the right of the surface S34, so the interval of the S34 is negative. In addition, the surface S36 and surface S37 are the two surfaces of the screen 220, and the image frames are formed on the surface S37.

To be noted, the data of Table 3 and Table 4 listed below are not used for limiting the invention. The parameters or settings may be altered by persons skilled in the art with reference to the disclosure of the invention, which still falls in the scope of the present invention.

TABLE 3

| Surface | Radius of Curvature (mm) | Interval (mm) | Refractive Index | Abbe's number | Notes |
|---|---|---|---|---|---|
| S1 | Infinity | 1.11 | | | light valve |
| S2 | Infinity | 1.05 | 1.506905 | 63.128269 | cover glass |
| S3 | Infinity | 5.15 | | | |
| S4 | Infinity | 35.25 | 1.56883 | 56.130661 | total internal reflection |
| S5 | Infinity | 5 | | | |
| S6 | 26.37828 | 0.5 | 1.5181 | 48.4 | third aspheric lens |
| S7 | 31.64942 | 7.668668 | 1.523459 | 51.540489 | |
| S8 | −99.51839 | 0.2 | | | |
| S9 | 43.28129 | 7.103118 | 1.528554 | 76.975515 | eleventh lens |
| S10 | −48.37619 | 1.5 | 1.804 | 46.570373 | tenth lens |
| S11 | 24.11116 | 7.599164 | 1.528554 | 76.975515 | ninth lens |
| S12 | −61.36694 | 0.15 | | | |
| S13 | 62.4268 | 4.231277 | 1.496997 | 81.608364 | eighth lens |
| S14 | −207.1582 | 0.15 | | | |
| S15 | 40.44547 | 4.716286 | 1.528554 | 76.975515 | seventh lens |
| S16 | −42.3932 | 1.2 | 1.799518 | 42.368074 | sixth lens |
| S17 | 28.98859 | 0.8 | | | |
| S18 | 56.06243 | 5.304056 | 1.496997 | 81.608364 | fifth lens |
| S19 | −18.22671 | 1 | 1.834807 | 42.713673 | fourth lens |
| S20 | 88.74028 | 14.2205 | | | |
| S21 | Infinity | 0.1 | | | aperture stop |
| S22 | −576.0485 | 3 | 1.61293 | 36.960613 | third lens |
| S23 | −27.7295 | 22.61878 | | | |
| S24 | 57.75385 | 2.3 | 1.531688 | 48.895238 | second lens |
| S25 | 190.5277 | 1.773049 | | | |
| S26 | 42.10398 | 2 | 1.48749 | 70.236252 | first lens |
| S27 | 57.31438 | 6.014996 | | | |
| S28 | Infinity | 2 | 1.52308 | 58.571369 | plate glass |
| S29 | Infinity | 45.27195 | | | |
| S30 | −22.26806 | 3 | 1.525279 | 55.95076 | second aspheric lens |
| S31 | −727.7708 | 20.83653 | | | |
| S32 | −5.692068 | 4 | 1.525279 | 55.95076 | first aspheric lens |
| S33 | −9.749554 | 33 | | | |
| S34 | 57.69715 | −91 | | | aspheric reflector |
| S35 | 3200 | 116 | | | curved reflector |
| S36 | Infinity | 12 | 1.491756 | 57.440791 | screen |
| S37 | Infinity | | | | |

In addition, the surfaces S6, S30, S31, S32, S33, and S34 are aspheric surfaces, and the values of K, $C_4$, $C_6$, $C_8$, and $C_{10}$ are shown in Table 4, C2 is zero in this embodiment.

TABLE 4

| | K | $C_4$ | $C_6$ | $C_8$ | $C_{12}$ |
|---|---|---|---|---|---|
| S6 | −3.200117 | 8.3659077E−06 | −8.8438618E−09 | 1.7509533E−11 | −1.2522161E−14 |
| S30 | 0.7626029 | 4.5760658E−06 | −2.2995529E−09 | −1.2186638E−10 | 1.2450657E−12 |
| S31 | −21187.32 | 1.2860380E−05 | −4.5185481E−08 | 8.5488104E−11 | 9.2798926E−14 |
| S32 | −0.9820892 | 9.5887565E−05 | 1.0039950E−07 | −8.6478269E−10 | 1.8745098E−12 |
| S33 | −0.8625166 | 6.8199080E−05 | −9.8948136E−09 | −8.3410457E−11 | 1.6481445E−13 |
| S34 | −4.641739 | −9.6846554E−08 | 3.4397392E−11 | −5.2578598E−15 | 3.0411207E−19 |

The material of the third aspheric lens A3' of the embodiment includes glass, when the temperature of the image system 100' is about 20 degrees Celsius, the diameter of geometric light spot of the visible light formed on the light valve 210 is about 185 micrometers. When the temperature of the image system 100' is about 40 degrees Celsius, the diameter of geometric light spot of the visible light formed on the light valve 210 is about 1064 micrometers. In other words, the diameter variation of geometric light spot of the visible light formed on the light valve 210 is about 5.75 times. However, when the material of the aspheric lens is plastic, the diameter variation is about 17 times. In addition, when the temperature of the image system 100' raises from 20 degrees Celsius to 40 degrees Celsius, the diameter of geometric light spot of the infrared light formed on the light valve 210 increases from 251 micrometers to 1117 micrometers. In other words, the diameter variation of geometric light spot of the infrared light formed on the light valve 210 is about 4.45 times. However, when the material of the aspheric lens is plastic, the diameter variation is about 10.7 times.

According to the above description, because the material of the third aspheric lens A3' includes glass, the refractive index of the third aspheric lens A3' does not easily decrease with the temperature raising, so as to prevent the back focal length of the image system 100' from shifting substantially with the temperature variation of the image system 100' and assist the visible light and the infrared light to focus on the same plane. Therefore, the image quality of the image system 100' of the embodiments is improved.

Figure 5A:
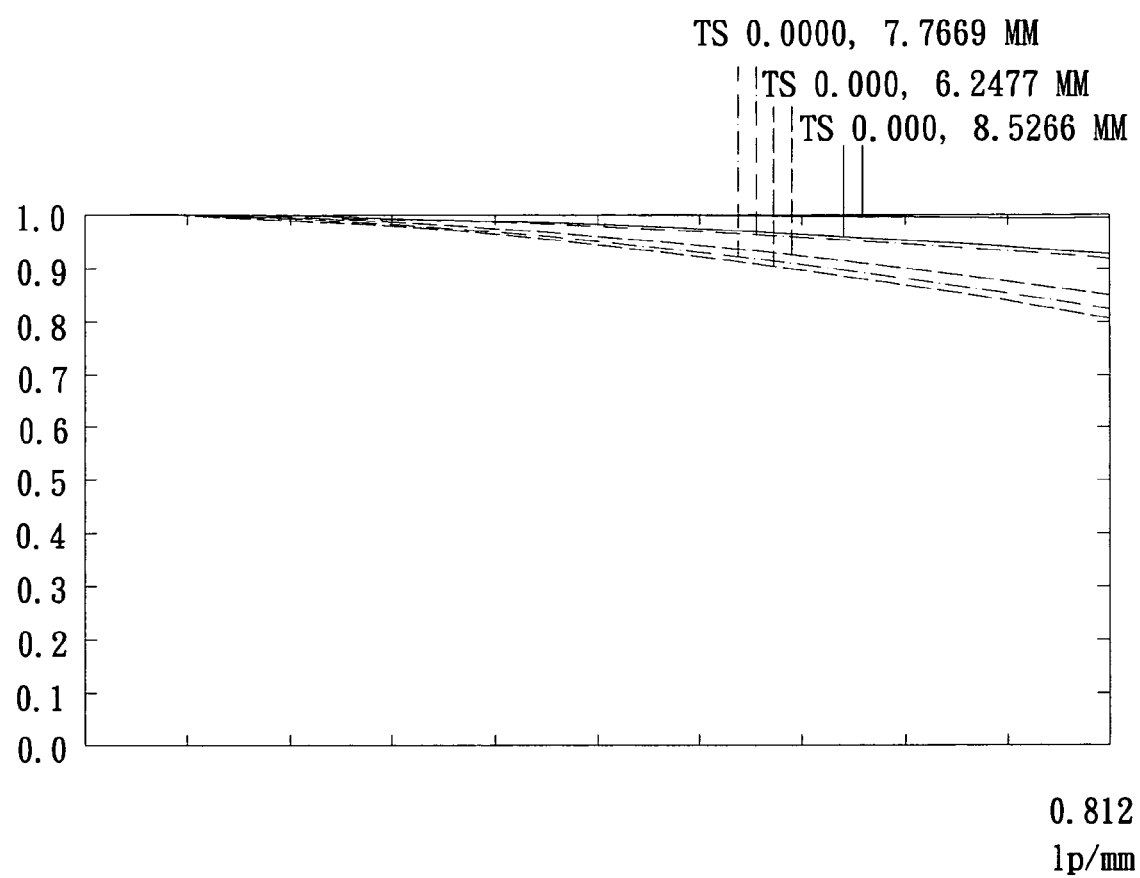
FIG. 5A is an optical modulation transfer function diagram of the image system according to the second embodiment of the invention.
Figure 5B:
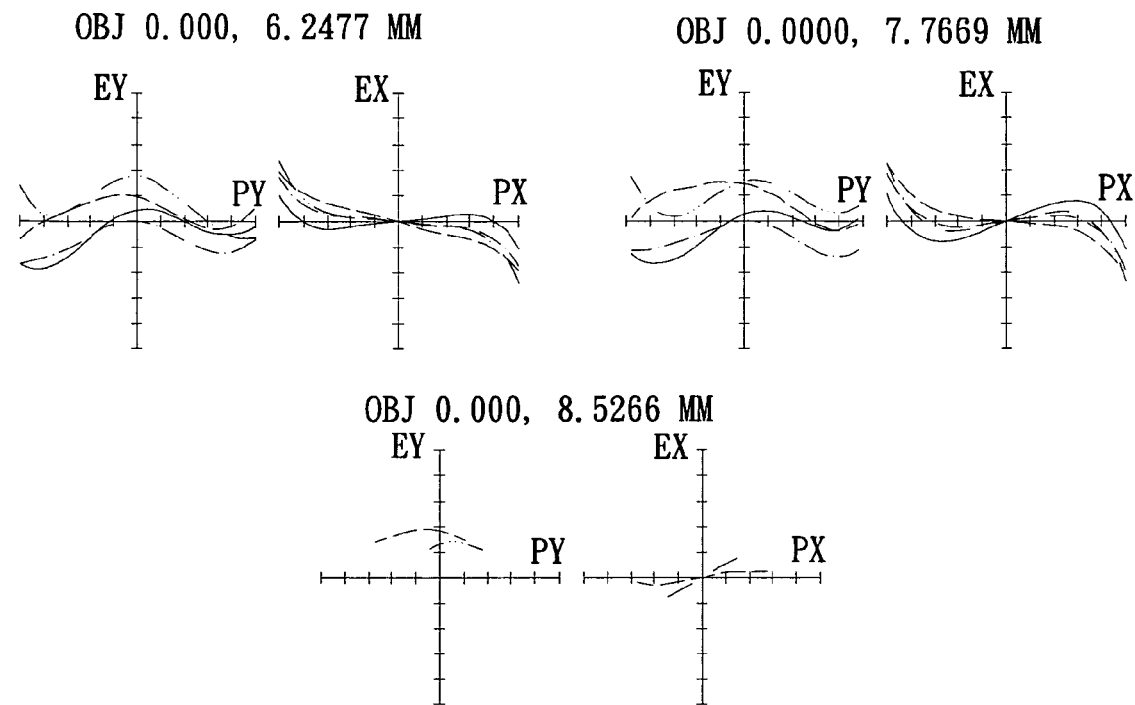
FIG. 5B is transverse ray fan diagrams of the image system according to the second embodiment of the invention.
Figure 5C:
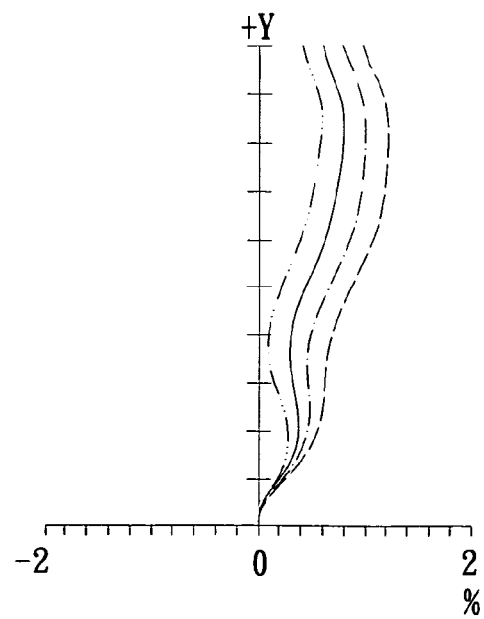
FIG. 5C is a distortion diagram of the image system according to the second embodiment of the invention.

FIG. 5A is an optical modulation transfer function diagram of the image system according to the second embodiment of the invention, in which the transverse axis is the line pair per millimeter, and the vertical axis is the recognition rate. FIG. 5B is transverse ray fan diagrams of the image system according to the second embodiment of the invention, and FIG. 5C is a distortion diagram of the image system according to the second embodiment of the invention. As described above, the graphics in FIGS. 5A to 5C fall within standard ranges, so that the image system 100' of the embodiment has a good imaging quality.

In summary, in the image system according to the embodiments of the invention, the lens nearest to the light valve is the third aspheric lens having a positive refractive power, so that the image system may effectively decrease the aberration to improve the imaging quality. Furthermore, because the material of the third aspheric lens includes glass, the refractive index of the third aspheric lens does not easily decrease with the temperature raising, so as to prevent the back focal length of the image system from shifting substantially with the temperature variation of the image system and assist the visible light and the infrared light to focus on the same plane. Therefore, the image quality of the image system of the embodiments is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image system, adapted to a projection display apparatus for projecting an image beam provided by a light valve of the projection display apparatus onto a screen of the projection display apparatus, the image system comprising: a first lens group, having a negative refractive power and comprising a first aspheric lens, a second aspheric lens, a first lens, a second lens, and a third lens arranged in order, wherein said first aspheric lens and said second aspheric lens each have a negative refractive power, and said first lens, said second lens and said third lens each have a positive refractive power;

a second lens group, having a positive refractive power and disposed between the first lens group and the light valve, the second lens group comprising a third aspheric lens having a positive refractive power and nearest to the light valve in the second lens group, wherein a material of said third aspheric lens of the second lens group comprises glass, the thermal-optical coefficient of the glass is between $1.0 \times 10^{-6}$/K and $12.5 \times 10^{-6}$/K, and the refractive index of the glass is between 1.482 and 1.847, wherein said third lens is disposed between said second lens and the second lens group;

an aspheric reflector, disposed on a transmission path of the image beam and located between the first lens group and the screen for reflecting the image beam passing through the first lens group and second lens group; and a curved reflector, disposed on the transmission path of the image beam and located between the aspheric reflector and the screen for reflecting the image beam reflected by the aspheric reflector onto the screen; and wherein said third aspheric lens is a cemented lens.

2. The image system as claimed in claim 1, wherein said third aspheric lens is a molding glass.

3. The image system as claimed in claim 2, wherein said second lens is disposed between said first lens and the second lens group.

4. The image system as claimed in claim 3, wherein the second lens group further comprises, a fourth lens, a fifth lens, a sixth lens, a seventh lens, an eighth lens, a ninth lens, a tenth lens and an eleventh lens arranged in order, said eleventh lens is disposed between said tenth lens and said third aspheric lens, and refractive powers of said fourth lens, said fifth lens, said sixth lens, said seventh lens, the said eighth lens, said ninth lens, said tenth lens and said eleventh lens are positive, negative, positive, negative, positive, positive, positive, negative and positive respectively.

5. The image system as claimed in claim 4, wherein said fourth lens and said fifth lens form a first cemented lens, said sixth lens and said seventh lens form a second cemented lens, and said ninth lens, said tenth lens and said eleventh lens form a third cemented lens.

6. The image system as claimed in claim 4, wherein said first lens, said second lens, said third lens, said fourth lens, said fifth lens, said sixth lens, said seventh lens, said eighth lens, said ninth lens, said tenth lens and said eleventh lens are spherical lenses.

7. The image system as claimed in claim 1 further comprising an aperture stop disposed between the first lens group and the second lens group.

* * * * *